(12) United States Patent
Berkner

(10) Patent No.: US 7,623,711 B2
(45) Date of Patent: Nov. 24, 2009

(54) WHITE SPACE GRAPHS AND TREES FOR CONTENT-ADAPTIVE SCALING OF DOCUMENT IMAGES

(75) Inventor: Kathrin Berkner, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 605 days.

(21) Appl. No.: 11/173,766

(22) Filed: Jun. 30, 2005

(65) Prior Publication Data

US 2007/0003166 A1    Jan. 4, 2007

(51) Int. Cl.
*G06K 9/34*    (2006.01)
(52) U.S. Cl. .................................... 382/176
(58) Field of Classification Search ................ 382/112, 382/173, 176, 180–181, 202–204, 286, 305–306; 345/619; 358/453, 462; 715/204, 209, 229, 715/243, 246, 247, 254, 273, 276
See application file for complete search history.

(56) References Cited

U.S. PATENT DOCUMENTS

| | | | | |
|---|---|---|---|---|
| 5,513,304 A | * | 4/1996 | Spitz et al. ................... | 715/268 |
| 5,592,574 A | * | 1/1997 | Chilton et al. ............... | 382/295 |
| 5,664,027 A | * | 9/1997 | Ittner .......................... | 382/170 |
| 5,841,900 A | * | 11/1998 | Rahgozar et al. ............. | 382/176 |
| 5,848,184 A | * | 12/1998 | Taylor et al. ................. | 382/173 |
| 5,892,843 A | * | 4/1999 | Zhou et al. ................... | 382/176 |
| 5,999,664 A | * | 12/1999 | Mahoney et al. ............. | 382/305 |
| 6,562,077 B2 | * | 5/2003 | Bobrow et al. ............... | 715/204 |
| 7,136,511 B2 | * | 11/2006 | Harrington et al. ........... | 382/112 |
| 7,171,618 B2 | * | 1/2007 | Harrington et al. ........... | 715/229 |
| 7,177,488 B2 | * | 2/2007 | Berkner et al. ............... | 382/298 |
| 7,246,263 B2 | * | 7/2007 | Skingle ........................ | 714/18 |
| 7,330,608 B2 | * | 2/2008 | Berkner et al. ............... | 382/298 |

OTHER PUBLICATIONS

M. Aiello et al., Document understanding for a broad class of documents, International Journal on Doucment Analysis and Recongition, Springer-Verlag 2002, 16 Pages.
Korean Office Action with English translation for KR Patent Application No. 10-2006-0059048.

* cited by examiner

*Primary Examiner*—Jose L Couso
(74) *Attorney, Agent, or Firm*—Blakely, Sokoloff, Taylor & Zafman LLP

(57) ABSTRACT

A method, article of manufacture, and apparatus for content-adaptive scaling of document images is described. In one embodiment, the method comprises identifying spatial relationships between document objects of a document image, determining space separating pairs of neighboring document objects, and determining at least one scaling factor based on the space separating the document objects in the document image and based on display device characteristics.

67 Claims, 15 Drawing Sheets

FIG. 6

WHITE SPACE GRAPHS AND TREES FOR CONTENT-ADAPTIVE SCALING OF DOCUMENT IMAGES

FIELD OF THE INVENTION

The present invention relates to scaling of images of documents; more particularly, the present invention is related to content-adaptive scaling of document images.

BACKGROUND OF THE INVENTION

Thumbnails are commonly used as visual aids in document browsing and retrieval applications. The thumbnails are typically generated by scaling the document image. The scaling that is performed may be solely a geometric scaling operation such as traditional downsampling. There are a number of others ways to scale document images. One such way is to perform scaling that allows for layout distortion. For example, SmartNail technology focuses on showing selected readable text in a display window of fixed size. With SmartNail technology, preservation of layout is surrendered in favor of readable text see U.S. patent application Ser. No. 11/023,142, entitled "Semantic Document Smartnails", filed Dec. 22, 2004. Other techniques include combinations of geometric and layout scaling. For example, a technology, referred to herein as Dynamic Document Icons, focuses on capturing distinct layout characteristics while neglecting readability of text regions. In contrast to SmartNail technology, in Dynamic Document Icons, the size of the icon is not fixed, but depends on the content shown in iconic form. For more information on Dynamic Document Icons, see K. Berkner, K., U.S. patent application Ser. No. 11/019,802, entitled "Dynamic Document Icons", filed Dec. 21, 2004.

Graph models are popular in the document analysis field to capture information about document layout. Graph models may be derived in a number of ways. One example of a way to derive a graph model is described in Aiello M., Monz, C., Todoran, L., Worring, M., "Document Understanding for a Broad Class of Documents," International Journal on Document Analysis and Recognition (IJDAR), vol. 5(1), pp. 1-16, 2002. In this reference, centers of text zones are modeled as vertices, and edges between vertices signal neighborhood relationships between associated zones. This information is required for further logical analysis including extraction of reading order and classification of text zones.

Graph models in general are frequently used in document analysis for analysis of web pages or table structures. Operations on graphs include graph matching techniques that may be used to compare different graphs. An overview of this field is given in Lopresti, D., Wilfong, G., "A Fast Technique for Comparing Graph Representations with Applications to Performance Evaluation," IJDAR, vol. 6, pp. 219-229, 2004.

White space in documents is often used to identify the space between items, such as columns of text in a document. There are several methods of computing white space in document images. One way is presented in Breuel, T., "An Algorithm for Finding Maximal Whitespace Rectangles at Arbitrary Orientations for Document Layout Analysis," Proceedings of ICDAR, 2003 Aug. 3-6; Edinburgh, Scotland, pp. 66-70. 2003. Proprietary OCR systems may have their own way to detect white space in order to support extraction of text components.

Another technology for white space expansion is discussed in U.S. Pat. No. 5,592,574, entitled "Method and Apparatus for Expansion of White Space in Document Images on a Digital Scanning Device," to Chilton, J. K., Cullen, J., Ejiri, K., issued Jan. 7, 1997. As discussed in U.S. Pat. No. 5,592,574, in order to obtain better visibility white space between document objects is increased.

SUMMARY OF THE INVENTION

A method, article of manufacture, and apparatus for content-adaptive scaling of document images is described. In one embodiment, the method comprises identifying spatial relationships between document objects of a document image, determining space separating pairs of neighboring document objects, and determining a scaling factor based on the space separating the document objects in the document image and based on display device characteristics.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 6 is an adjacency matrix for a graph associated with the example document in FIG. 2.

DETAILED DESCRIPTION OF THE PRESENT INVENTION

Figure 1:
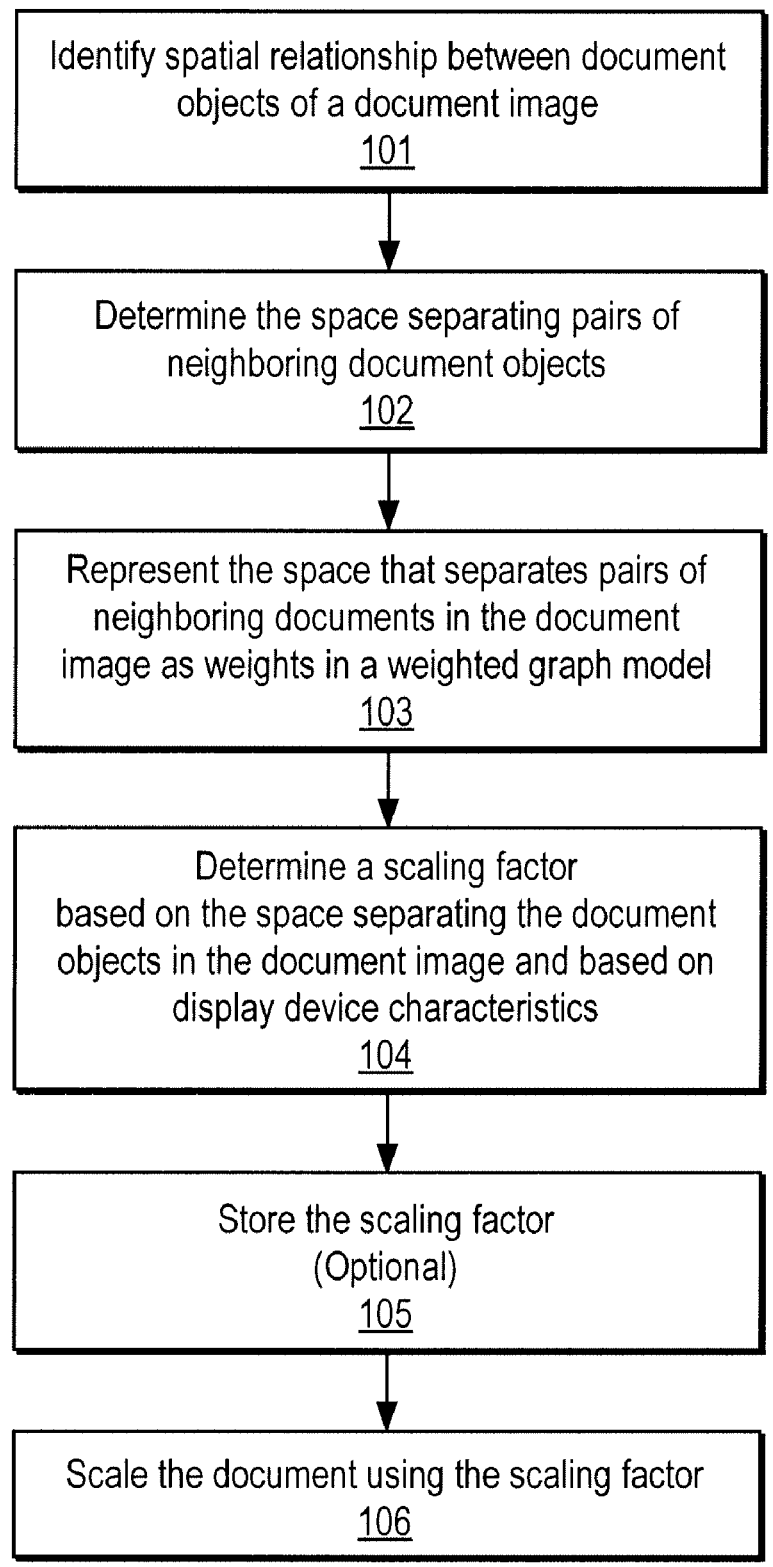
FIG. 1 is a flow diagram of one embodiment of a process for performing content-adaptive scaling of a document image.

Determining an appropriate downsampling factor for document images is disclosed. In one embodiment, the downsampling factor is selected such that selected layout features are still recognizable in the scaled small images. In one embodiment, the scaling factor is derived using a white space analysis. The resulting minimal appropriate scaling factor that is derived from a white space analysis depends on the content of the document image. Note that this implies that the size appropriate to convey layout information in a scaled document image may be device dependent. In one embodiment, no iconification of elements is performed.

In the following disclosure, white space separating document zones is used to determine minimal appropriate scaling factors. These document zones may include text zones (e.g., blocks of text), title zones, columns, figures, footnotes, headings, figure and caption tables. Scaling is allowed as long as white space is visible. If white space is not recognizable anymore, too much scaling has been applied. Separating white space between text zones is captured in a graph or tree model.

The term "white space" is based on the type of document, but is particularly suited as a term when used in the context of a document having black text on a white background. For purposes herein, the term "white space" is generalized to include background that is created by subtraction of text zones. The background could be white, gray, a solid color, or even a continous tone image.

For purposes herein, a tree is a specific graph, namely a graph where there is exactly one path between any pair of nodes. The white space trees are rooted directed trees, i.e., trees that have exactly one node—the root node—that has no edge entering it. Graphs, and therefore trees, are data structures. The interconnected type is the characterization of a white space graph. A hierarchical order is responsible for turning the more general graph into a tree.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

The determination of downsampling factors given the constraints that specific document objects be distinguishable through separating white space after downsampling is described. In one embodiment, three operations are used for such a technique. First, neighboring units or objects are determined. Secondly, the white space between neighboring objects is calculated. Lastly, given the various white space measurements between neighboring objects and their background colors as well as the display characteristics, a minimal scaling factor is derived.

FIG. 1 is a flow diagram of one embodiment of a process for performing content-adaptive scaling of a document image. The process is performed by processing logic that may comprise hardware (e.g., circuitry, dedicated logic, etc.), software (such as is run on a general purpose computer system or a dedicated machine), or a combination of both, including firmware.

Referring to FIG. 1, the process begins by processing logic identifying spatial relationships between document objects of a document image (processing block 101). In one embodiment, the document objects comprise text zones. In one embodiment, processing logic identifies spatial relationships between the document objects of the document image by determining a geometric relationship between two objects sharing an edge in a Voronoi diagram.

After identifying spatial relationships, processing logic determines the space separating pairs of neighboring document objects (processing block 102). The geometric space may comprise an area filled with white space or background color around lines of text in a document image. In one embodiment, white space is computed as the average color found in a band around text lines. In one embodiment, processing logic determines the space separating pairs of neighboring document objects by determining a length of the intersection of a line through center points of a pair of neighboring document objects. In such a case, the length of the intersection with object separating white space represents the measured separating space. Processing logic may add weights into a graph model representing the spatial relationships between the document objects, where the weights correspond to the measured separating space. The weights may be normalized. For example, in another embodiment, processing logic determines the space separating pairs of neighboring document objects by determining a length of a parameterized line segment between each pair of neighboring document objects directed between center points of each pair of neighboring document objects. In such a case, the length represents the measured separating space. Note that center points can be geometric centers or centers of gravity.

Processing logic represents the space that separate pairs of neighboring document objects in the document image using a graph model (processing block 103). In one embodiment, graph relationships in the graph model are represented as list pairs of connected vertices with included weights representing separated space between document objects. The graph model may be represented within a computer system as an association matrix.

In one embodiment, processing logic represents the spatial relationships using Delaunay triangulation and transforms triplets for the Delaunay triangulation into the graph model. In one embodiment, the graph model includes a plurality of vertices, and each of the vertices is a center point of one of the document objects.

In one embodiment, processing logic stores the graph as metadata in a file (e.g., a JPM file) that contains the image data for the document objects.

Once the space that separates pairs of neighboring document objects has been identified, processing logic determines at least one scaling factor based on the space separating the document objects in the document image and based on display device characteristics (processing block 104). In one embodiment, processing logic determines at least one scaling factor by determining a scaling factor that causes scaling to the document image when applied while allowing a minimal amount of space to remain visible when displayed on a display device having the display device characteristics.

In one embodiment, processing logic determines a scaling factor based on the space separating a set of document objects in the document image and based on display device characteristics by determining the scaling factor using a constant reflecting a minimal visually recognizable space separation measured in pixel units. In one embodiment, the constant is set for a class of documents. In one embodiment, the constant is set for a class of devices. In one embodiment, the constant is computed from the document image and a display device characterization. The constant may depend on a display device having the display device characteristics.

Once one or more scaling factors have been determined, processing logic stores the scaling factors (processing logic 105). This is optional. The scaling factor may be stored in metadata for the file of the document image. For example, the scaling factor may be stored in the metadata for a JPM file format along with the display device characteristics associated with the scaling factor.

In one embodiment, processing logic scales the document using the scaling factor (processing block 106). This is also optional.

Establishment of Neighborhood Relationships Between Document Objects via Voronoi Diagrams and Delaunay Triangulation In one embodiment, a geometric neighborhood relationship between two objects $O_1$ and $O_2$ is established if they share an edge in a Voronoi diagram. The Voronoi diagram is computed for the geometric center points $z_i$ of the document objects $O_i$, i.e.

$$z_i = \tfrac{1}{2}[\text{upper left corner of } O_i + (\text{width of } O_i, \text{height of } O_i)].$$

The dual of the Voronoi diagram, the Delaunay triangulation, is used as a representation of the neighborhood relationships. A Voronoi diagram represents a division of the plane into regions according to the nearest neighbor rule. The nearest neighbor rule states that each point is associated with the region of the plane closest to it. The output of this division into regions is represented by line segments and vertices. A Delaunay triangulation contans an edge connecting two sites in the plane if and only if their Voronoi regions share a commom edge. The Voronoi diagram and the Delaunay triangulation are duals in the sense that Voronoi vertices correspond to Delaunay triangles, Voronoi regions correspond to sites, and edges of both types correspond by definition. For more information, Franz Aurenhammer, Voronoi Diagrams—A Survey of a Fundamental Geometric Data Structure, ACM Computing Surveys, Vol. 23, No. 3, September 1991.

Figure 2:
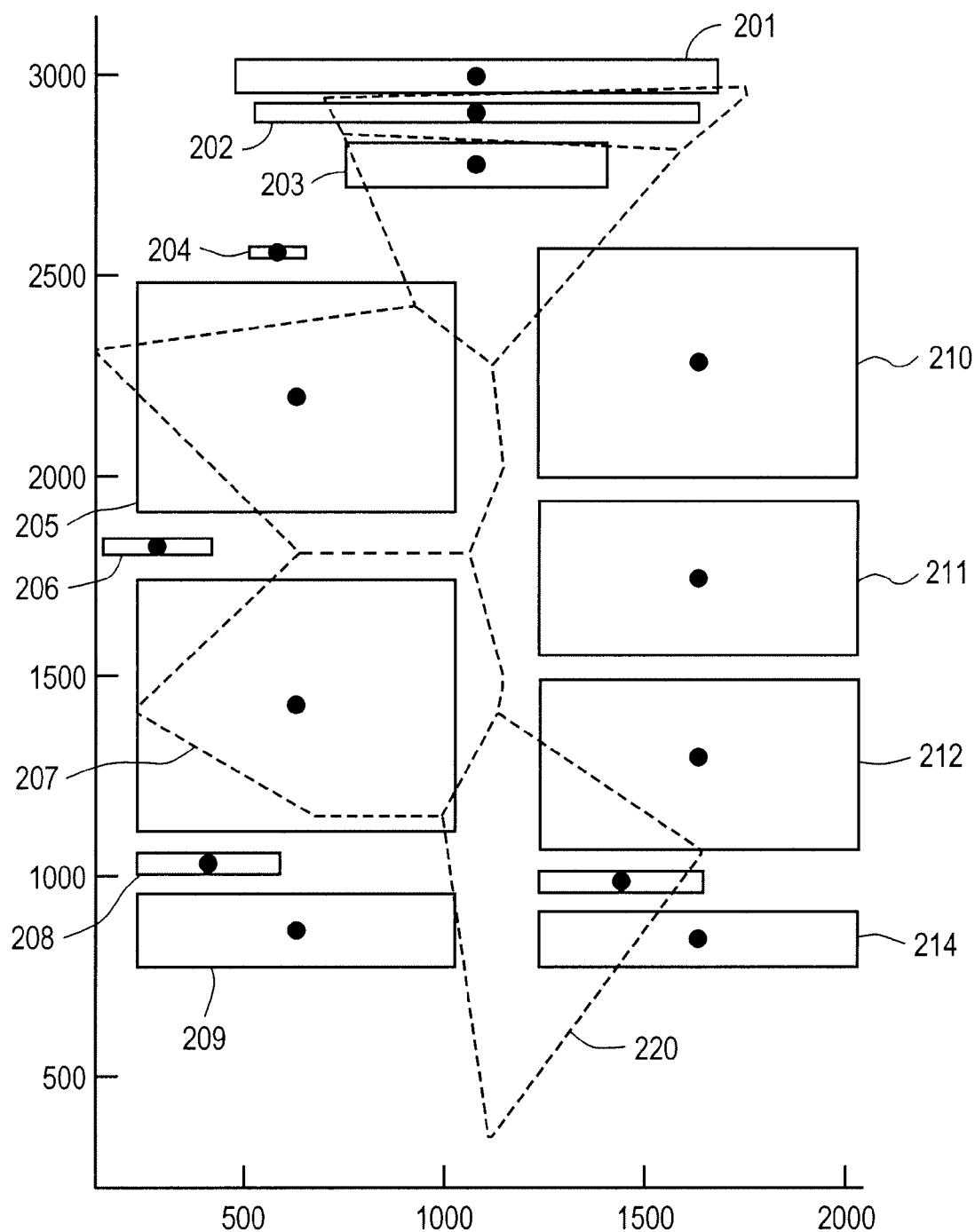
FIG. 2 shows an example document and its Voronoi diagram of the documents objects.

The Delaunay triangulation is given by a sequence of center point triplets. Each triplet reflects a neighborhood relationship between the three center points. FIG. 2 shows an example document and its Voronoi diagram of the documents objects. Referring to FIG. 2, document objects 201-214 are shown. These document objects may be text regions (e.g., titles, paragraphs of text, etc.) in a document. The lines in the diagram, such as line 220, run perpendicular to line segments (not shown) that go between the centerpoints of two document objects, such as document objects 213 and 214 in the case of line 220. Voronoi diagrams and Delaunay triangulation are a well known in the computational geometry art.

The triplets for the Delaunay triangulation of the example document of FIG. 2 are shown in Table 1. In one embodiment, these neighborhood relationships are transformed into a graph model in which each center point of an object is a vertex in the graph and an edge between two vertices represents the existence of a neighborhood relation between them.

TABLE 1

Triplets representing the Delaunay triangulation corresponding to the Voronoi diagram in FIG. 2.

| | | |
|---|---|---|
| 4 | 2 | 1 |
| 4 | 3 | 2 |
| 3 | 10 | 2 |
| 10 | 1 | 2 |
| 5 | 3 | 4 |
| 4 | 11 | 10 |
| 7 | 5 | 6 |
| 7 | 11 | 5 |
| 6 | 8 | 7 |
| 7 | 12 | 11 |
| 7 | 13 | 12 |
| 9 | 7 | 8 |
| 14 | 12 | 13 |
| 9 | 13 | 7 |
| 9 | 14 | 13 |
| 14 | 11 | 12 |
| 14 | 10 | 11 |

Computation of Separating White Space Between Neighboring Zones

In one embodiment, white space between two neighboring objects $O_i$ and $O_j$ is computed by connecting the center points $z_i$ and $z_j$ by a straight line and measuring the length of the line segment intersecting the white space between $O_i$ and $O_j$. To avoid actually rendering the straight line, separating white space $W_{ij}$ between objects $O_i$ and $O_j$ is computed in the following way.

The straight line through the center points is parameterized by the following equation:

$$g: z_i + \lambda(z_j - z_i). \qquad (1)$$

An example follows to illustrate the parameterization. The four corners of document object $O_i$ may be denoted by A,B,C,D. The bounding box of document object $O_i$ is given by the line segments AB, BC, CD, DA. To reiterate, the bounding box information comes from logical analysis. The four corners of document object $O_j$ are denoted by E,F,G,H. The intersection of the straight line through the center points $z_i$ and $z_j$ with each bounding box line of $O_i$ and $O_j$ is derived as follows.

For the example of the intersection of the center connecting line with the bounding box segment AB, the condition to satisfy is:

$$z_i + \lambda(z_j - z_i) = A + \mu(B - A) \qquad (2)$$

Figure 3:
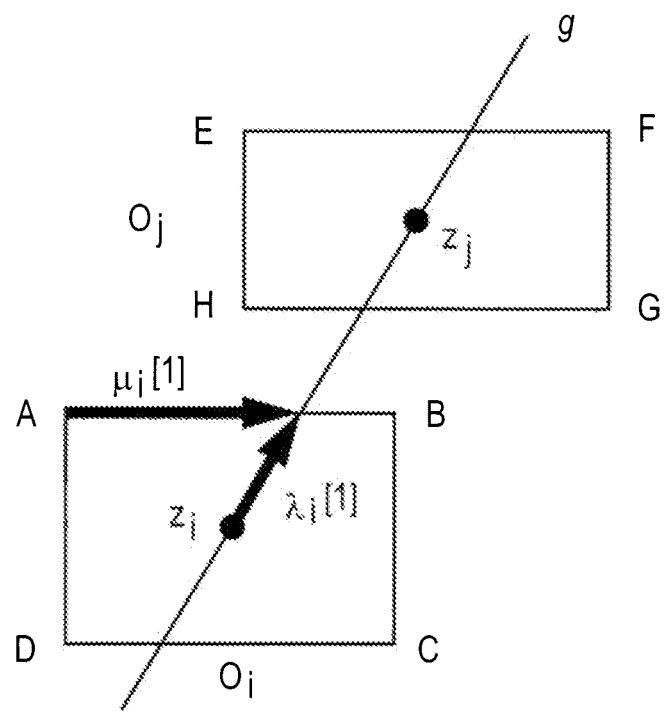
FIG. 3 illustrates a calculation of an intersection of a center-connecting line with a bounding box segment of a document object.

In one embodiment, the following may be used to provide pairs of $\lambda$ and $\mu$ values of various sign combinations:

1. $0 < \lambda_i[1] \leq 1$, $0 < \mu_i[1] \leq 1$; $O_j$ above $O_i$ (an example of which is shown in FIG. 3),
2. $\lambda_i[1] < 0$, $0 < \mu_i[1] \leq 1$; $O_j$ below $O_i$,
3. $1 < \mu_i[1] \leq \infty$: $O_j$ right of $O_i$, but line g not parallel to the bounding box segment,
4. $-\infty < \mu_i[1] < 0$: $O_j$ left of $O_i$, but line g not parallel to the bounding box segment, and
5. No solution means the center connecting line is parallel to the bounding box segment.

Figure 4:
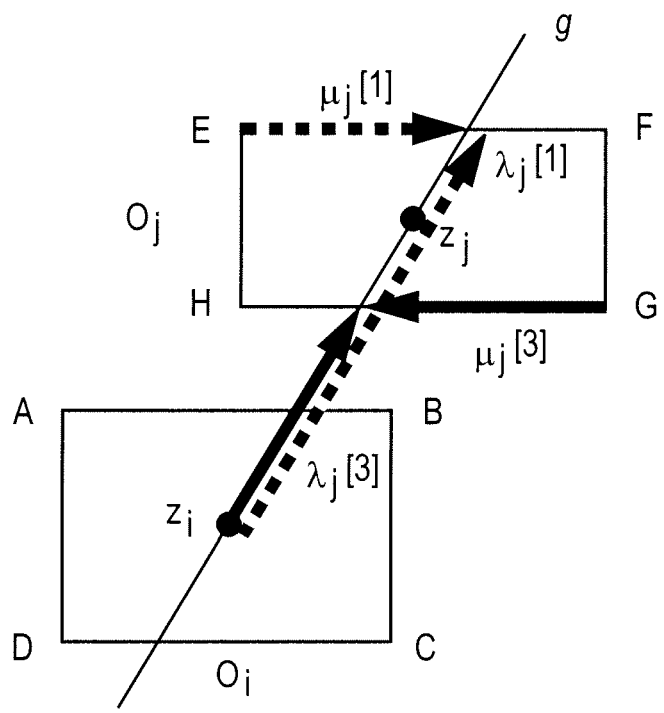
FIG. 4 illustrates an alternative calculation of an intersection of a center-connecting line with a bounding box segment of a document object.

The same is performed for the intersections of the center connecting line with the remaining bounding box segments of $O_i$ (resulting in parameters $\lambda_i[2], \lambda_i[3], \lambda_i[4]$) and the bounding box elements of object $O_j$ resulting in parameters $\lambda_j[k]$ for each bounding box segment k. An example of these is shown in FIG. 4. For each object pair, only one combination of values $(\lambda_i[m], \lambda_j[k])$ exists that describes the segment of separating white space, namely the combination $(\lambda_i[m], \lambda_j[k^*[m]])$ with $\lambda_i[m] < \infty$, $\lambda_j[k^*[m]] < \infty$, and $$k^*[m] = \arg\min_k \{|\lambda_j[k]| \, |\lambda_j[k]| < \infty, \lambda_i[m] \cdot \lambda_j[k] > 0\} \text{ (see FIG. 5)}. \qquad (3)$$

In one embodiment, the separating white space is then measured by $$W_{ij} = |(\lambda_i[m] - \lambda_j[k^*[m]]) | \cdot \|z_j - z_i\|_2. \qquad (4)$$

Figure 5:
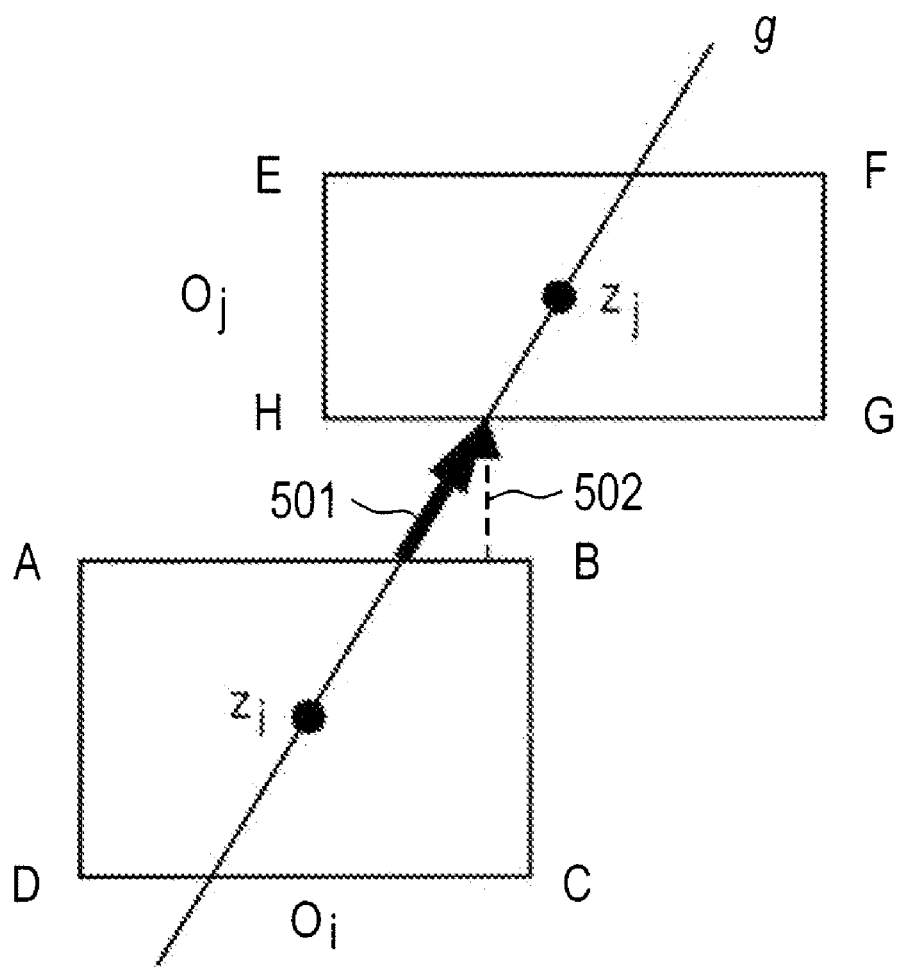
FIG. 5 illustrates an alternative measurement to measure separating white space by calculating the distance described by the dashed line.

An alternative to measuring separating white space is to calculate the distance described by the dashed line in FIG. 5. Referring to FIG. 5, instead of calculating the distance described by solid arrow 501, the distance described by dashed line 502 is calculated. Such a calculation would be well within the skill in the art.

White Space Graph Model

In one embodiment, the measured separating white space $W_{ij}$ between objects $O_i$ and $O_j$ are added as weights to the graph model. This causes each of the neighborhood relationship graphs to be a weighted graph. More specifically, in one embodiment, given an edge $e_{ij}$ between two vertices $v_i$ and $v_j$, the weight $p_{ij}$ associated with that edge is given by the following equation:

$$p_{ij} = 1/W_{ij} \qquad (5)$$

Use of equation (5) means that an edge between objects with a large separating white space have small weights, while an edge between objects with a small separating white space have large weights. If the information about non-neighbors is not stored, then no normalization is needed. In the case that objects $O_i$ and $O_j$ are not neighbors, a weight $p_{ij} = 0$ is defined.

The set of all pairs (i,j) that are connected by an edge is referred to herein as the neighborhood relationship index set. The final weighted graph is referred to herein as a White Space Graph (WSG). An example for the graph associated with the example document in FIG. 2 is given by the adjacency matrix shown in FIG. 6.

Figure 6:
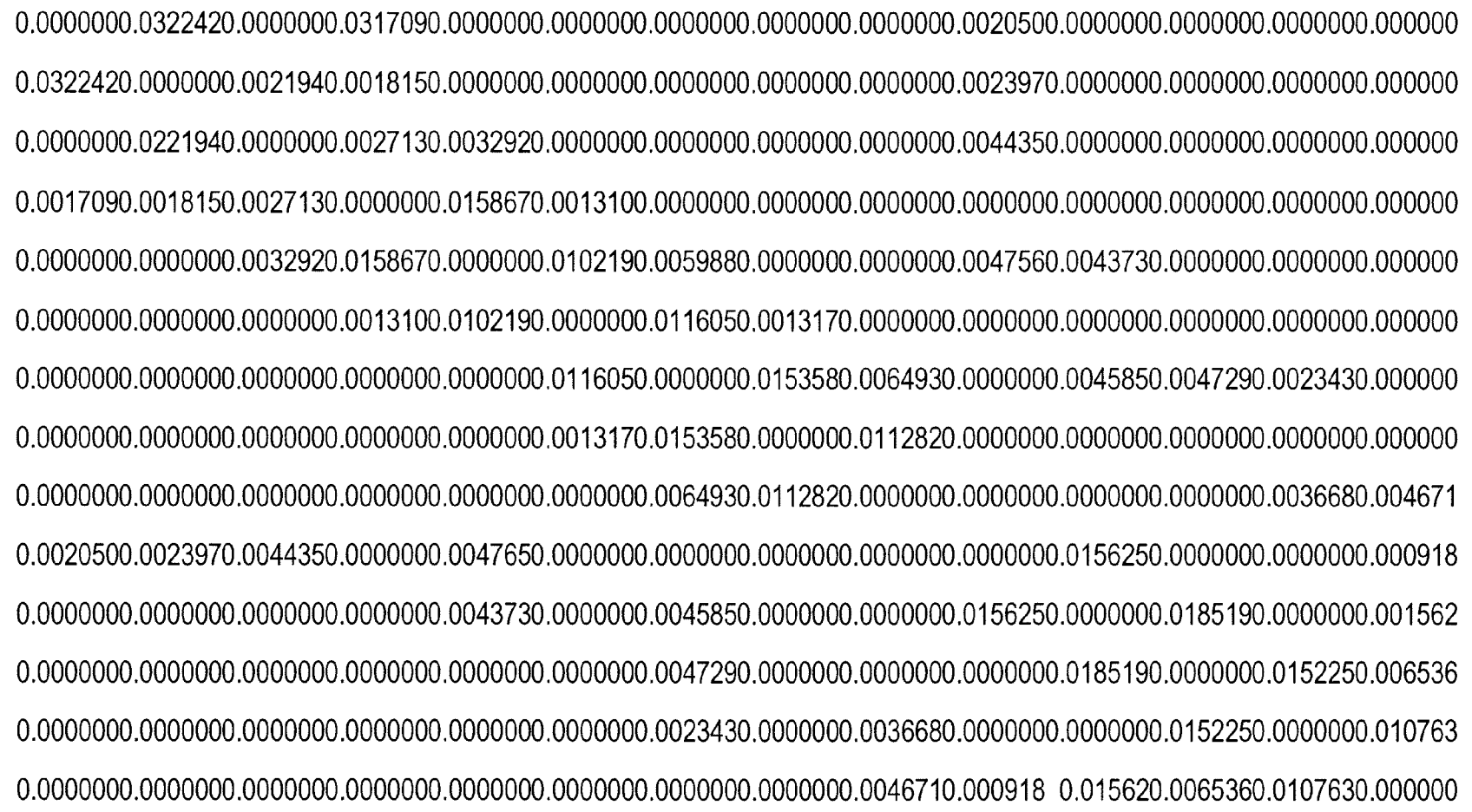

Referring to FIG. 6, rows and columns represent the vertices, a zero entry at position (i,j) means that there is no edge between the associated vertices $v_i$ and $v_j$, and non-zero entries reflect the weights $p_{ij}$. In an alternative embodiment, the graph relationships are represented using list pairs of connected vertices including the weight (which is referred to herein as a list view).

The following is pseudocode to create a WSG from a document image:

define anchor point (geometric centers or centers of gravity) for each zone;
compute voronoi tesselation from the anchor points;
for each site that share an edge in the voronoi diagram, compute the separating white space between the zones with anchor points equal to data points associated with each site;
create a graph having each anchor point as a vertex;
connect vertices that share an edge in the voronoi diagram by an edge;
add length of separating white space line segment as weight to the corresponding edge.

Scaling to Minimal White Space

In one embodiment, given a White Space Graph, a scaling factor $s^*$ is computed as the solution s to $$s/W_{ij} \geq \epsilon > 0 \qquad (6)$$

for all i,j in the neighborhood relationship index set, i.e.

$$s^* = \epsilon \cdot \max(W_{ij}). \qquad (7)$$

In one embodiment, the constant ϵ reflects a minimal visually recognizable white space separation measured in pixel units. The constant may depend on the display device. For example, high contrast displays may allow for a smaller ϵ than low contrast displays.

In one embodiment, the threshold ϵ is set manually for a class of documents. As an example, for documents containing mostly black text on a white background and are displayed on an Apple Cinema display, the constant ϵ is set to two pixels for black text on white background.

In another embodiment, the constant ϵ is set automatically from the document image and a display device characterization. In this case, first, color appearance can be modeled using, for example, CIECAM02 or iCAM, which are well-known in the art. Next, contrast sensitivity functions, for example, the one in S-CIELAB can be applied to model contrast in low resolution images. In one embodiment, contrast is measured by calculating $\Delta E$ units along the white space portion of the center connecting lines when computing the separating white space between neighboring zones.

Embedding of Hierarchical Document Structure into White Space Trees

The document layout may not be given solely by a collection of document objects, but may also contain a hierarchical structure, imposing groupings of objects to form coarse units, such as columns or title sections. In one embodiment, such a hierarchy is imposed based on a combination of logical and geometric information, referred to herein as layout information in the following. Using white space information, an alternative hierarchy can be imposed based on purely geometrical information. Adding hierarchical structure to a White Space Graph leads to the creation of a White Space Tree (WST).

In a bottom-up fashion, in one embodiment, a tree is formed by starting with all vertices $v_i$ of the WSG as leaf nodes of the WST. In a merging process, leaf nodes are merged. In one embodiment, the leaf nodes are merged by iteratively merging the nodes with largest edge weight into a new parent node. The weight for the edge between a child and a new parent node is that of the edge(s) between the children. This may be performed by the following code.

```
Initialize the list of open nodes as V_open = V
while V_open ≠ Ø
    {v_{i_1}, ... v_{i_k}} = arg max_{v ∈ V_open}(p(v))
    create new node v*, add v_{i_1}, ... v_{i_k} as children to v*
    remove v_{i_1}, ... v_{i_k} from V_open
    add v* to V_open
```

Figure 7:
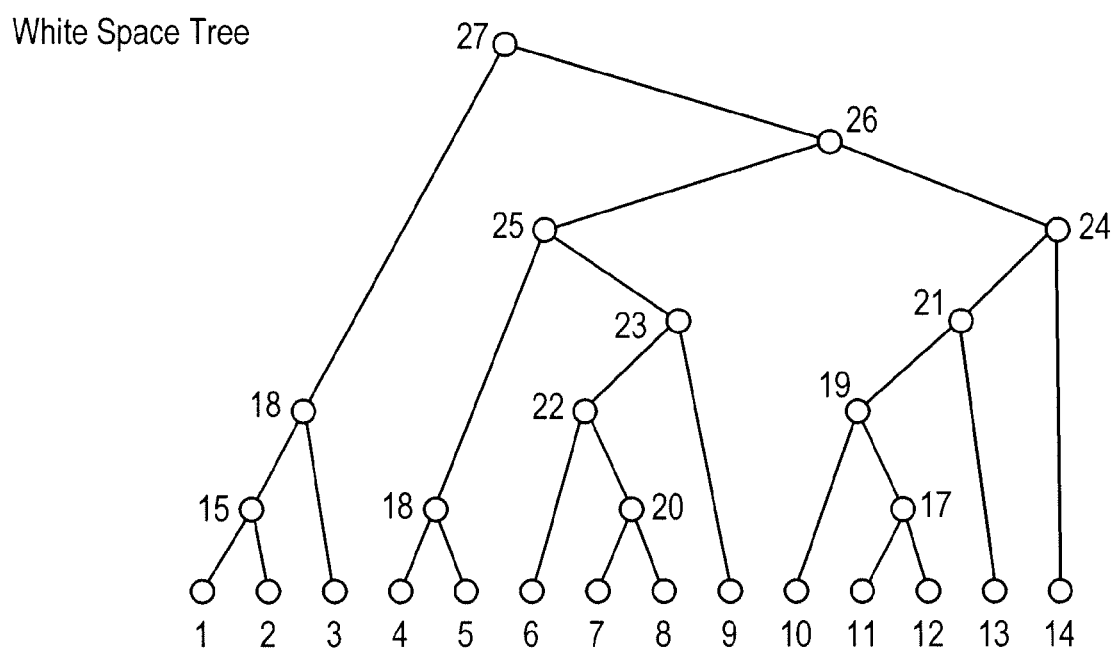
FIG. 7 illustrates a graphical tree representation.

The results of merging the White Space Graph vertices into a tree is given in list view form in Table 2. The graphics tree representation is shown in FIG. 7.

The weights corresponding to tree nodes provide information on separating white space of the group of all descendents of a parent node to other nodes outside the group of descendents.

Figure 8:
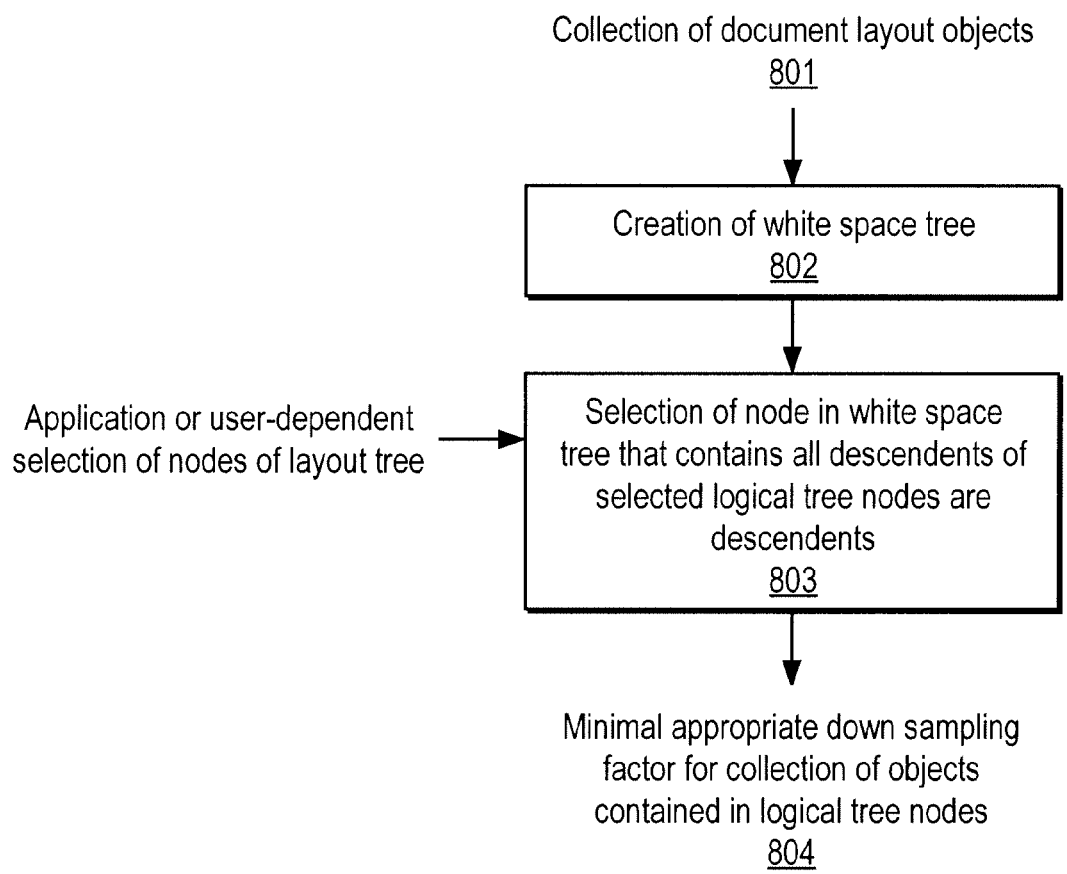
FIG. 8 is a flow diagram of one embodiment of a process for embedding hierarchical document structure into white space trees.

FIG. 8 is a flow diagram of one embodiment of a process for embedding hierarchical document structure into white space trees. The process is performed by processing logic that may comprise hardware (e.g., circuitry, dedicated logic, etc.), software (such as is run on a general purpose computer system or a dedicated machine), or a combination of both, including firmware.

Referring to FIG. 8, the process begins by processing logic receiving a collection of layout objects (processing block 801). Using the collection of layout objects, processing logic creates a white space tree (processing block 802). In response to the white space tree and application or user-dependent selection of nodes of a layout tree, processing logic selects a node in the white space tree that contains all descendents of selected logical tree nodes as descendents (processing block 803). Thereafter, processing logic identifies the appropriate downsampling factor for the collection of objects contained in logical tree nodes (processing block 804).

TABLE 2

White Space Tree for the example document.

| child node | parent node | weight |
|---|---|---|
| 1 | 15 | 0.032242 |
| 2 | 15 | 0.0232242 |
| 3 | 16 | 0.022194 |
| 4 | 18 | 0.015867 |
| 5 | 18 | 0.015867 |
| 6 | 22 | 0.011605 |
| 7 | 20 | 0.015358 |
| 8 | 20 | 0.015358 |
| 9 | 23 | 0.011282 |
| 10 | 19 | 0.015625 |
| 11 | 17 | 0.018519 |
| 12 | 17 | 0.018519 |
| 13 | 21 | 0.015225 |
| 14 | 24 | 0.010763 |
| 15 | 16 | 0.022194 |
| 16 | 27 | 0.004435 |
| 17 | 19 | 0.015625 |
| 18 | 25 | 0.010219 |
| 19 | 21 | 0.015225 |
| 20 | 22 | 0.011605 |
| 21 | 24 | 0.010763 |
| 22 | 23 | 0.011282 |
| 23 | 25 | 0.010219 |
| 24 | 26 | 0.004759 |
| 25 | 26 | 0.004756 |
| 26 | 27 | 0.004435 |
| 27 | 0 | 0 |

Figure 9:
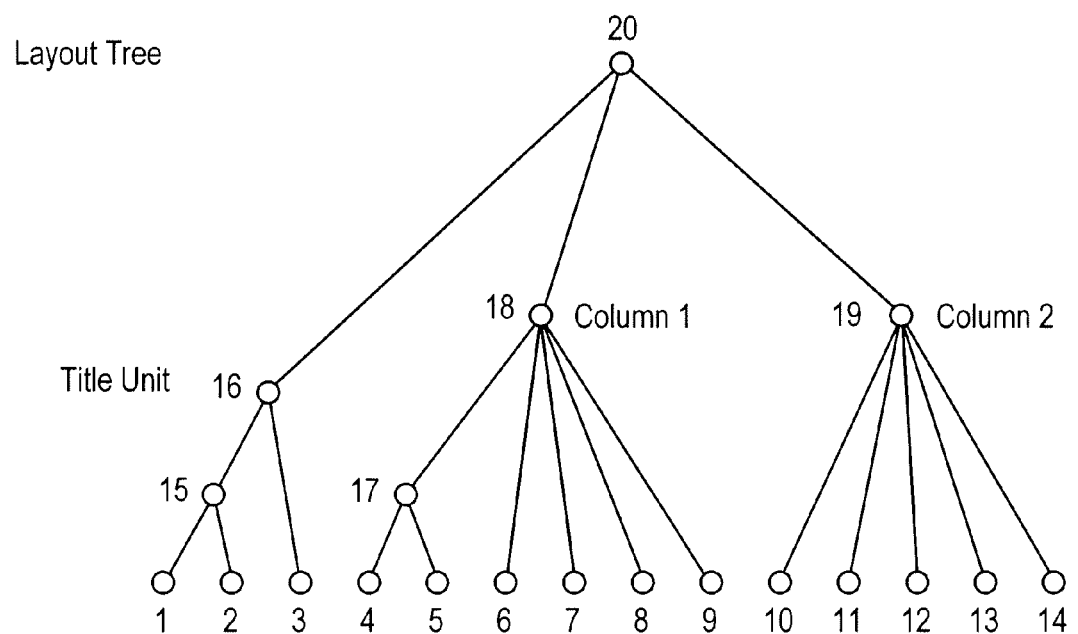
FIG. 9 is an example of a layout tree.

It may be important for an application to make sure that separations between selected layout units, e.g. columns of a document, are visible after scaling. The individual elements of a layout unit (document zones) are leaf nodes of the WST. The hierarchical nature of the layout structure can be captured in a layout tree, where each leaf node represents a document zone, parent nodes represent groupings of zones, such as title units, abstracts, columns, images plus figure captions etc. An example of a layout tree is shown in FIG. 9.

White Space Graphs and Trees as Metadata in JPM

The WSG and WST representations can be stored as metadata in a file that contains the document objects. In one embodiment, the file is a JPM file that contains the document objects, represented by the vertices of the WSG, as JPM layout objects. Given a specific application, e.g. thumbnail generation, the size of a thumbnail could be automatically computed from the metadata. In one embodiment, one graph is independent of the display device and is stored for various display devices. Thus, in one embodiment, either or both of the WSG and WST are stored as metadata in JPM in order to control scaling during specific decoding tasks.

Figure 15:
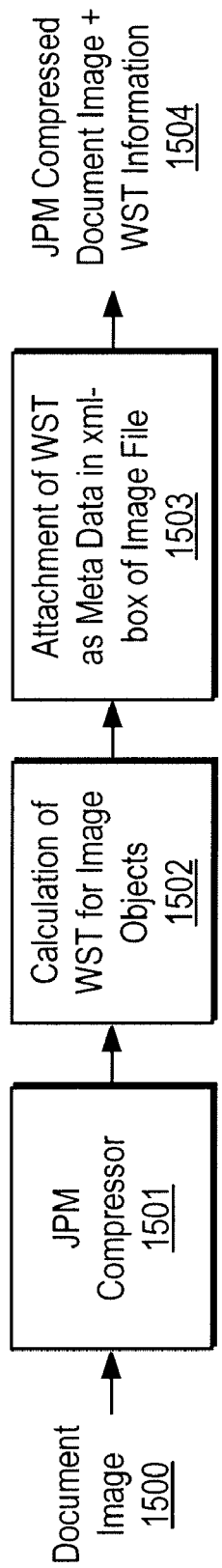
FIG. 15 illustrates a system for creating a JPM compressed document image containing a WST as meta data in an XML box.

FIG. 15 illustrates a system for creating a JPM compressed document image containing a WST as meta data in an XML box. This enables accessing the WST representation as meta data attached to compressed image data, thereby allowing efficient decoding. Referring to FIG. 15, a JPM compressor 1501 receives document image 1500 and performs JPM compression. WST generation unit 1502 receives the JPM file output of JPM compressor 1501 and calculates the WST for the image objects in the JPM file. File attachment unit 1503 attaches the WST as metadata in an XML box of the image file, thereby producing a JPM compressed document image with WST information (1504).

Figure 16:
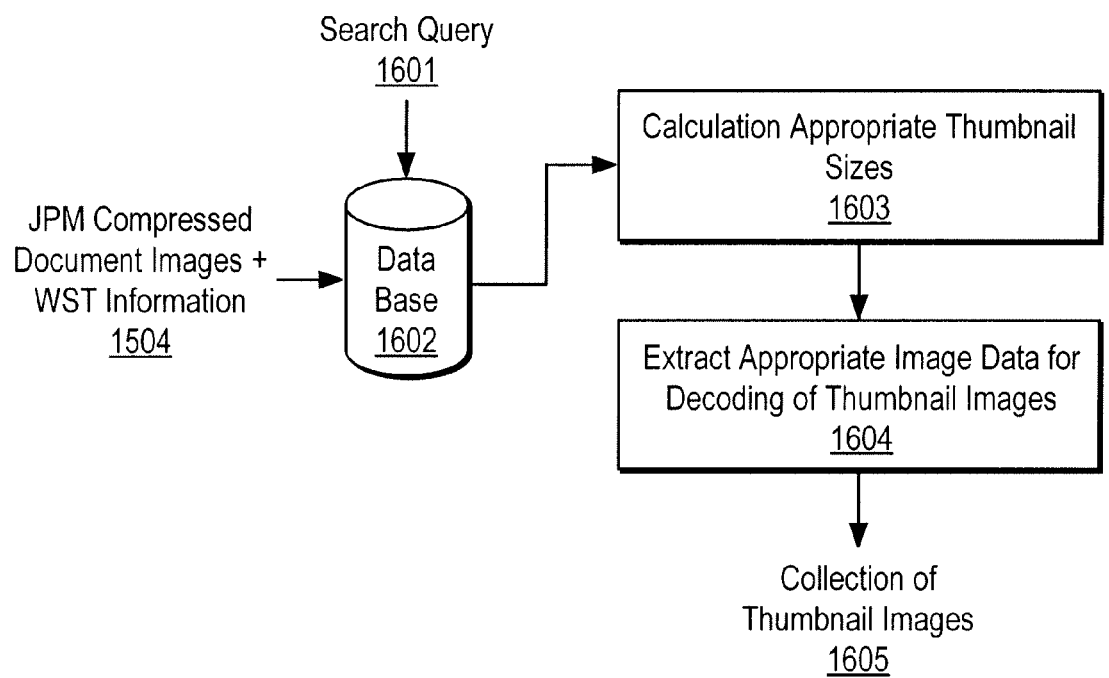
FIG. 16 is a flow diagram of one embodiment of a process for extracting and decoding appropriate data for thumbnail image creation in response to a search query.

FIG. 16 is a flow diagram of one embodiment of a process for extracting and decoding appropriate data for thumbnail image creation in response to a search query. The process is performed by processing logic that may comprise hardware (e.g., circuitry, dedicated logic, etc.), software (such as is run on a general purpose computer system or a dedicated machine), or a combination of both, including firmware.

Referring to FIG. 16, JPM compressed document image with WST information (1504) is stored in database 1602. A search query 1601 is received by database 1602. In response thereto, processing logic calculates the appropriate thumbnail size for the target device of the query generator (processing block 1603). Then, processing logic extracts the appropriate image data for decoding the thumbnail images (processing block 1604), thereby resulting in a collection of thumbnail images (1605).

In an alternative embodiment, the compressor described above is not included and any object based representation of a document image may be used, such as PDF. In such a case, the WST may be added to the file.

Use of WSG and WST in Retrieval Methods

WSG and WST capture selected document layout information. Document layout information in general is used in the prior art to perform retrieval tasks, such as clustering of documents based on layout features, or document matching. Those methods can be applied to WSG and WST to support their use in retrieval applications.

Figure 10:
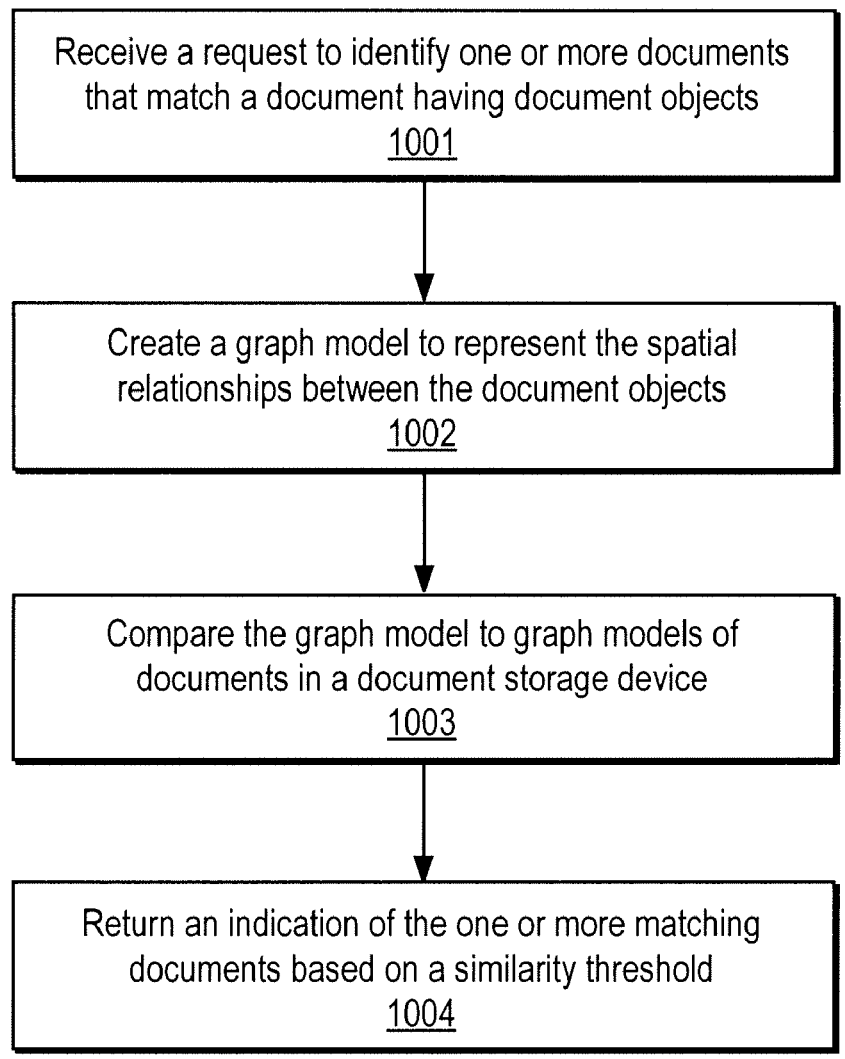
FIG. 10 is a flow diagram of one embodiment of a process for retrieving information.

FIG. 10 is a flow diagram of one embodiment of a process for retrieving information. The process is performed by processing logic that may comprise hardware (e.g., circuitry, dedicated logic, etc.), software (such as is run on a general purpose computer system or a dedicated machine), or a combination of both, including firmware.

Referring to FIG. 10, the process begins by processing logic receiving a request to identify one or more documents that match a document having document objects (processing block 1001). Next, processing logic creates a graph model to represent the spatial relationships between the document objects (processing block 1002). In one embodiment, the graph model includes weights corresponding to the measured separating space. Once the graph model has been created, processing logic compares the graph model to graph models of documents in a document storage device (processing block 1003) and returns an indication of the one or more matching documents based on a similarity threshold (processing block 1004). In one embodiment, the one or more matching documents are returned.

Similarly, the white space graphs and trees may be used to cluster documents. For example, when a document image is being input into a document archive, its corresponding white space tree or graph may be compared against those of others already stored in the document archive to classify the group of document images to which the new document image belongs.

Given the result to a document search query, a collection of documents has been returned. If thumbnails of these documents are desired, the question of what size those thumbnails should be is answered through a white space graph. Given a set of documents, compute a WSG for each document and determine the minimal scaling factor $s^*(D_i)$ for each document $D_i$. Either each document is scaled by its minimal scaling factor $s^*(D_i)$ (FIGS. 11-14), or each document is scaled by the largest of all individual minimal scaling factors, i.e. by $s^* = \max_i(s^*(D_i))$, to assure uniformity across the displayed thumbnails.

Figure 11:
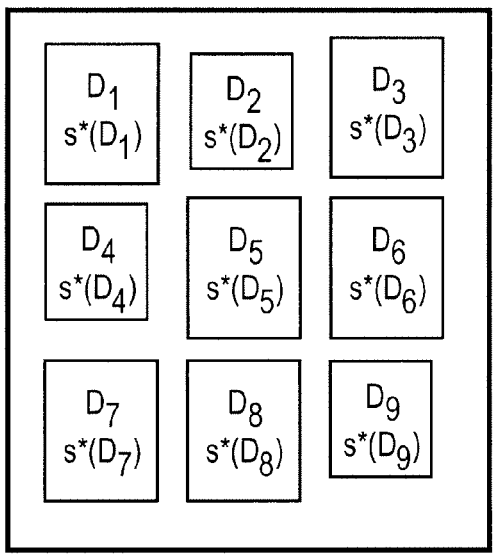
FIG. 11 illustrates a set of thumbnails for a collection of documents where each document is scaled by a minimal scaling factor.
Figure 12:
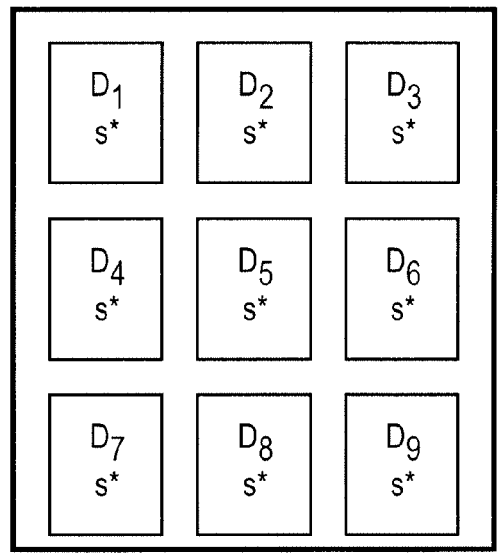
FIG. 12 illustrates a set a set of thumbnails for a collection of documents where each document is scaled by a minimal scaling factor.
Figure 13:
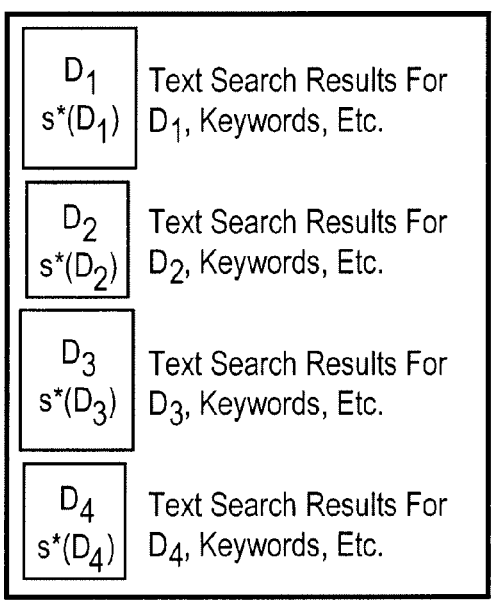
FIG. 13 depicts thumbnails for a collection of documents including text results for a search and retrieval task where each document is scaled by an individual minimal scaling factor.
Figure 14:
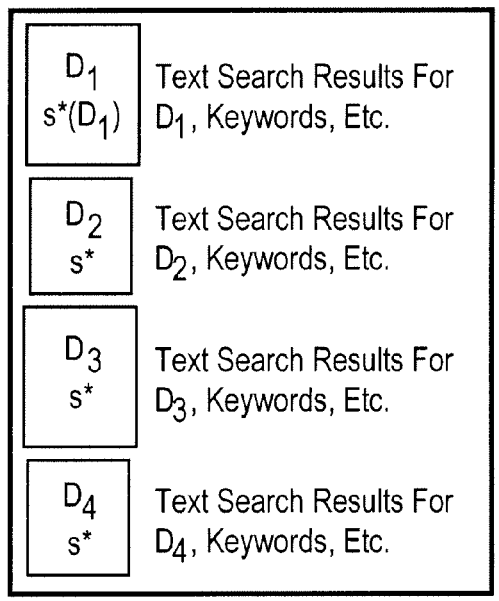
FIG. 14 depicts thumbnails for a collection of documents including text results for a search and retrieval task where each document is scaled by a minimal scaling factor.

This may be illustrated in FIGS. 11-14. FIG. 11 illustrates a set of thumbnails for a collection of documents where each document $D_i$ is scaled by an individual minimal scaling factor $s^*(D_i)$. FIG. 12 illustrates a set of thumbnails for a collection of documents where each document $D_i$ is scaled by a minimal scaling factor $s^*(D_i)$. FIG. 13 depicts thumbnails for a collection of documents including text results for a search and retrieval task where each document $D_i$ is scaled by an individual minimal scaling factor $s^*(D_i)$. FIG. 14 depicts thumbnails for a collection of documents including text results for a search and retrieval task where each document $D_i$ is scaled by a minimal scaling factor $s^*(D_i)$.

Finding an Appropriate Node in a WST Given a Set of Nodes in a Logical Tree

Figure 17:
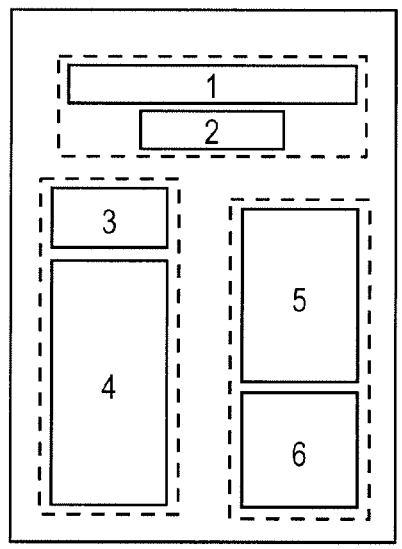
FIG. 17 is an example of a document layout structure.
Figure 18:
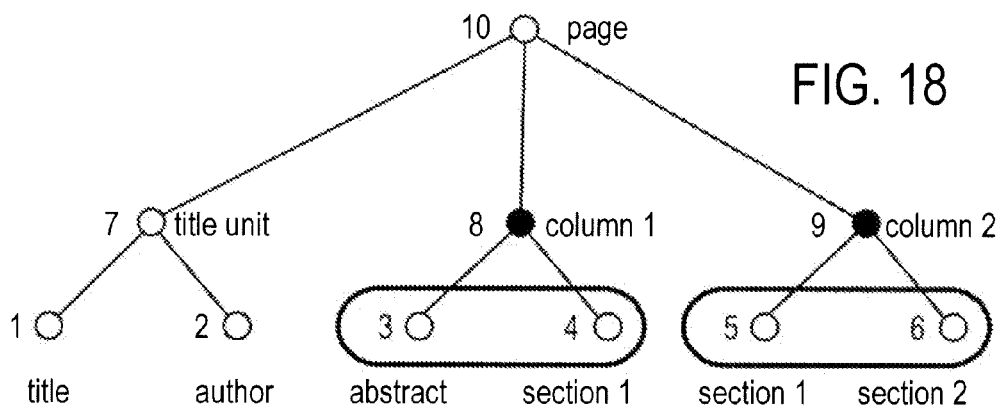
FIG. 18 is an example of a layout tree for the document of FIG. 17.
Figure 19:
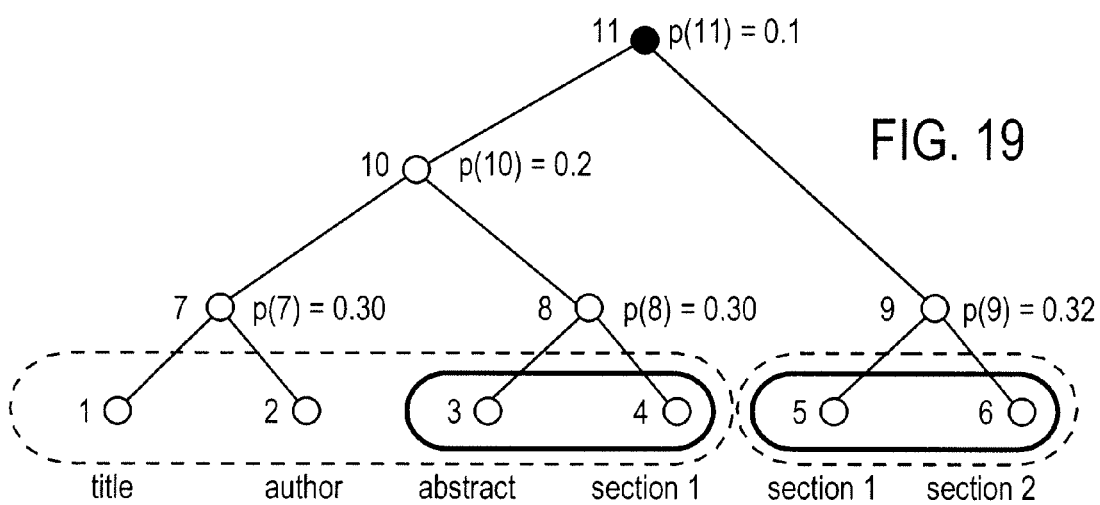
FIG. 19 is a WST for the document of FIG. 17.

FIG. 17 is an example of a document layout structure. Referring to FIG. 17, the document has six document objects that are numbers (1)-(6). FIG. 18 is an example of a layout tree for the document of FIG. 17, while FIG. 19 is a WST for the document of FIG. 17.

Given a request that selected layout units are to be clearly visually separable in the thumbnail, the nodes corresponding to the selected layout units have to be identified. If the selected layout units are column 1 and column 2 in the example, then the nodes $n_1=8$ and $n_2=9$ have to be identified. Next, for each identified layout unit node $n_i$, the set of leaf nodes of the subtree with root in $n_i$, denoted by $T_L(n_i)$, are identified. For the example in FIGS. 17-19, the set of leaf nodes of the subtree with root $n_1=8$ is $L(T_L(n_1))=\{3,4\}$, for the subtree with root in $n_2=9$ the leaf node set is $L(T_L(n_2))=\{5,6\}$. In order to assure that the columns 1 and 2 are visible distinct layout units in the thumbnail it has be assured that the white space between the set of zones represented by the leaf nodes in $L(T_L(n_1))$ and the set of zones represented by the leaf nodes in $L(T_L(n_1))$ is visible after scaling. In order to find the appropriate scaling factors, the WST $(T_w)$ is searched in a bottom-up fashion.

In one embodiment, starting from the leaf nodes of the WST, the node m* in the WST has to satisfy the following two conditions:

(1) given all the subtress with roots in the children $m_j$ of m*, denoted by $T_w(m_j)$, the leaf node sets $L(T_L(n_i))$ are contained in the leaf nodes sets of distinct trees $T_w(m_j)$, i.e.

$$(1) L(T_L(n_i)) \subset L(T_w(m_{j\_i})) \text{ and } L(T_L(n_i)) \cap L(T_w(m_j)) = \emptyset \text{ for } j \neq j\_i, \text{ and}$$

(2) finding the node m* that is has the smallest weight under all possible choices, i.e.

$$m^* = \arg\min_{\{m \in V(T\_W) \text{ satisfying condition (1)}\}} \{p(m)\}.$$

In the example in FIGS. 17-19, the solution to Equation (2) is m*=11.

Once the node m* is identified, a scaling factor larger than the weight p(m*) of m* needs to be chosen for appropriate scaling of the column layout units. That means an appropriate scaling factor s* for the units represented by nodes $n_i$ in $T_L$ is $(s^*)^{-1} > p(m^*)$, where m* is defined in Eq. (2).

For the example in FIG. 6, m*=11 and $(s^*)^{-1} > p(m^*) = p(11) = 0.1$.

Thus, given the layout units column 1 (node 8) and column 2 (node 9), the set of leaf nodes of the subtrees of those nodes are grouped by black solid lines. In the WST, the mode m* as designed in equation 2 below is node 11 (filled black circle). The set of leaf nodes of the children of m* are grouped by dashed lines. The sets of leaf nodes from the layout tree of FIG. 18 are contained in distinct leaf node sets of the WST of FIG. 19.

An example of pseudo code for finding an appropriate node in the WST given a node in a logical tree is as follows:

let $T_L$ be the layout tree $T_W$ be the WST of a document, $V(T_W)$ the set of nodes of $T_W$, p(v) the weight of node v.

request a set of nodes $\{n_i\}$ from $V(T_L)$.

find subtrees $T_W(m_1) \ldots T_W(m_N)$ of $T_W$ such that:

$$m^* = \arg\min_{\{m \in V(T\_W) \text{ satisfying condition}(*)\}} \{p(m)\} \text{ with}$$

$(*) L(T_L(n_i)) \subset L(T_w(m_j^*))$ and $L(T_L(n_i)) \cap L(T_w(m_j)) = \emptyset$ for $j^* \in \{1, \ldots N\}$ and $j \in \{1, \ldots N\} \backslash \{j^*\}$, where $m_j$, $j=1, \ldots N$, are the children nodes of node $m \in V(T_W)$.

Combination with Dynamic Document Icons

In one embodiment, the techniques described herein may be used in combination with Dynamic Document Icons as set forth in K. Berkner, K., U.S. patent application Ser. No. 11/019,802, entitled "Dynamic Document Icons", filed Dec. 21, 2004, incorporated herein by reference. Given a collection of documents $D_1, \ldots D_M$ as a return to a search query, an algorithm may be used to determine common layout features of all documents, e.g. all documents have two columns. In order to distinguish document thumbnails for those documents, image objects that are lower in the layout hierarchy than the column object should be distinguishable. To assure this first, the node m* and its weight p(m*) as the limiting scaling factor for white space separating the two columns layout units are determined as explained above for each document. The result is a set of nodes $m^*(D_i)$. Then for each document, a scaling factor $s(D_i)$ is determined such that the units represented by the children nodes $m_j(D_i)$ of $m^*(D_i)$ in the WST are assured of being visually separable, i.e. $s(D_i)$ needs to satisfy the condition $$(s(D_i))^{-1} > p(m_j(D_i)) \text{ for all } j=1, \ldots, N$$

In one embodiment, if $\max_j(p(m_j(D_i))) > \min_j(p(mj(D_i)))$, $s(D_i)$ can be set to $$s(D_i) = (\max_j\{p(m_j(D_i))\}), \text{ or in another embodiment}$$

$$s(D_i) = (\min_{j \neq j^*}\{p(m_j(D_i))\}) \text{ with } j^* = \arg\min_j\{p(m_j(D_i))\}.$$

In an application scenario, the common layout feature for the returned document collection may be visualized by a Dynamic Document Icon in the display window. In addition to the icon the individual thumbnails scaled by the factors $s(D_i)$ are displayed. An example for this scenario is shown in FIG. 20-26.

Figure 20:
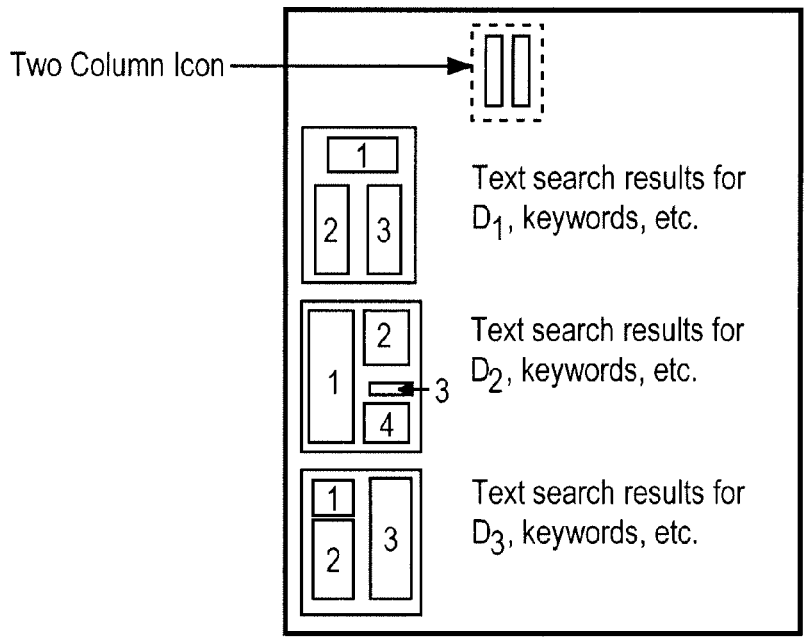
FIG. 20 illustrates a two column icon with iconified thumbnails of three documents returned as part of a text search, showing the zones with assured visible separations.
Figure 21:
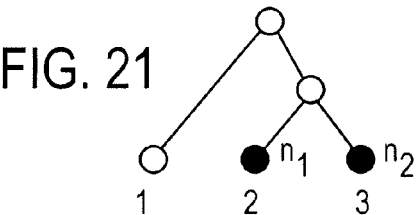
FIG. 21 is a layout tree with nodes for a document.
Figure 22:
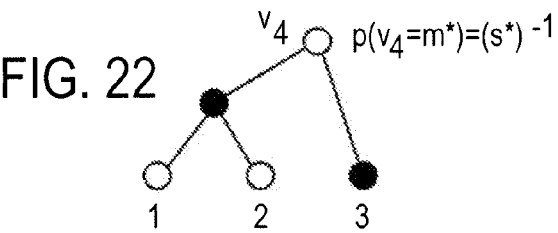
FIG. 22 is a WST for a document with an identified node.
Figure 23:
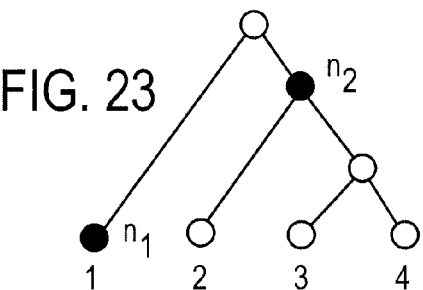
FIG. 23 is a layout tree with nodes for a document.
Figure 24:
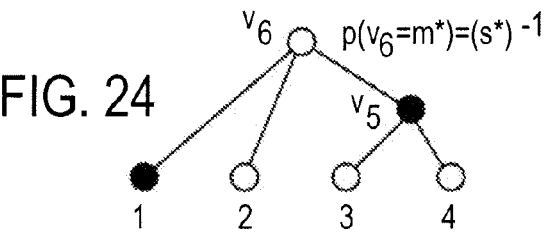
FIG. 24 is a WST for a document with an identified node.
Figure 25:
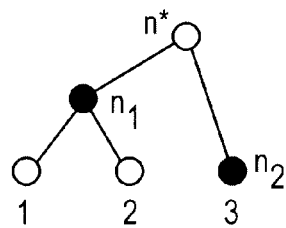
FIG. 25 is a layout tree with nodes for a document.
Figure 26:
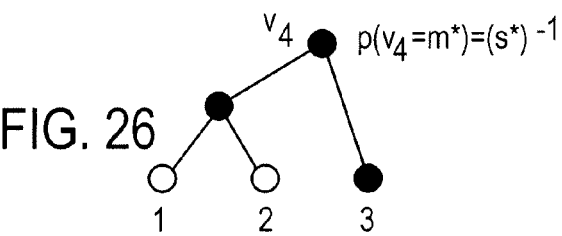
FIG. 26 is a WST for a document with an identified node.

FIG. 20 illustrates a two column icon with iconified thumbnails of three documents, $D_{1-3}$, returned as part of a text search, showing the zones with assured visible separations. FIG. 21 is a layout tree with nodes n1 and n2 for document $D_1$. FIG. 22 is a WST for document $D_1$ with an identified node m* computed from the equation for m* above. FIG. 23 is a layout tree with nodes n1 and n2 for document $D_2$. FIG. 24 is a WST for document $D_2$ with an identified node m* computed from the equation for m* above. FIG. 25 is a layout tree with nodes n1 and n2 for document $D_3$. FIG. 26 is a WST for document $D_3$ with an identified node m* computed from the equation for m* above.

Starting with a set of common layout units, such as two column layout (nodes n1 and n2) in a layout tree, thumbnails scaled with factor factors s(Di)>s* are computed that show the next level of division between zones given the scaling factor sufficient to eliminate separating white space between the two columns.

An Exemplary Computer System

Figure 27:
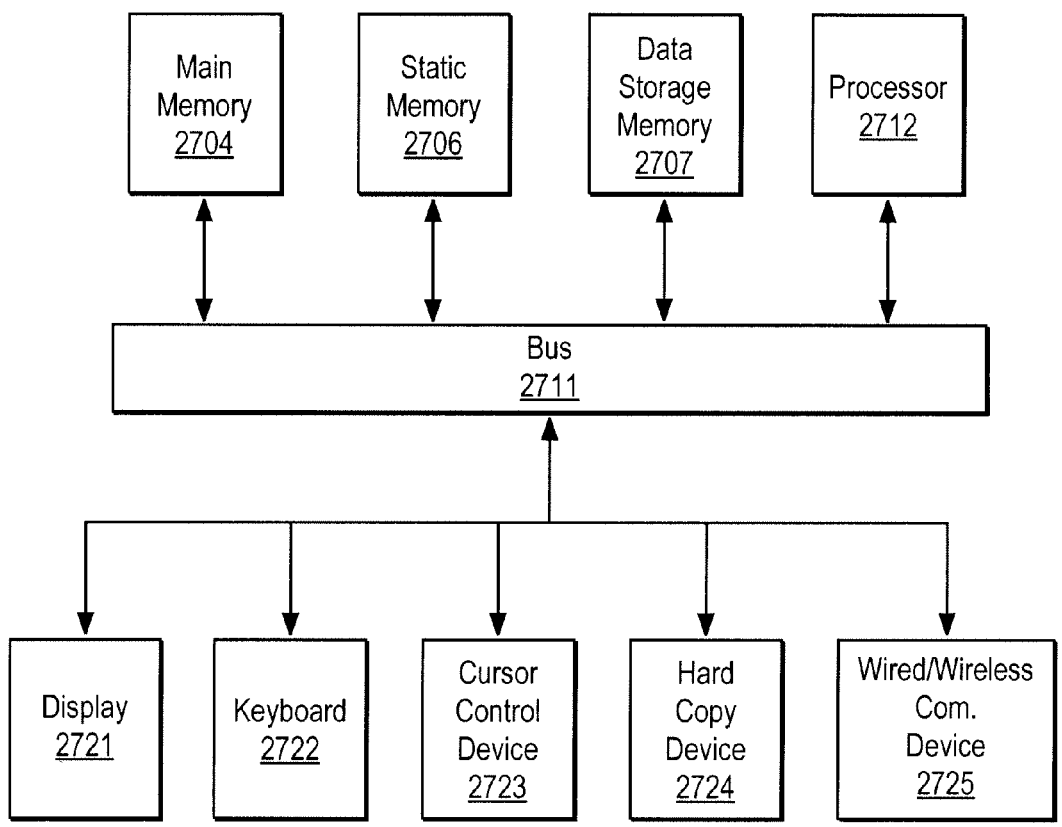
FIG. 27 is a block diagram of an exemplary computer system that may perform one or more of the operations described herein.

FIG. 27 is a block diagram of an exemplary computer system that may perform one or more of the operations described herein. Referring to FIG. 11, computer system 2700 may comprise an exemplary client or server computer system. Computer system 2700 comprises a communication mechanism or bus 2711 for communicating information, and a processor 2712 coupled with bus 2711 for processing information. Processor 2712 includes a microprocessor, but is not limited to a microprocessor, such as, for example, Pentium Processor, etc.

System 2700 further comprises a random access memory (RAM), or other dynamic storage device 2704 (referred to as main memory) coupled to bus 2711 for storing information and instructions to be executed by processor 2712. Main memory 2704 also may be used for storing temporary variables or other intermediate information during execution of instructions by processor 2712.

Computer system 2700 also comprises a read only memory (ROM) and/or other static storage device 2706 coupled to bus 2711 for storing static information and instructions for processor 2712, and a data storage device 2707, such as a magnetic disk or optical disk and its corresponding disk drive. Data storage device 2707 is coupled to bus 2711 for storing information and instructions.

Computer system 2700 may further be coupled to a display device 2721, such as a cathode ray tube (CRT) or liquid crystal display (LCD), coupled to bus 2711 for displaying information to a computer user. An alphanumeric input device 2722, including alphanumeric and other keys, may also be coupled to bus 2711 for communicating information and command selections to processor 2712. An additional user input device is cursor control 2723, such as a mouse, trackball, trackpad, stylus, or cursor direction keys, coupled to bus 2711 for communicating direction information and command selections to processor 2712, and for controlling cursor movement on display 2721.

Another device that may be coupled to bus 2711 is hard copy device 2724, which may be used for printing instructions, data, or other information on a medium such as paper, film, or similar types of media. Furthermore, a sound recording and playback device, such as a speaker and/or microphone may optionally be coupled to bus 2711 for audio interfacing with computer system 2700. Another device that may be coupled to bus 2711 is a wired/wireless communication capability 2725 to communication to a phone or handheld palm device.

Note that any or all of the components of system 2700 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims that in them recite only those features regarded as essential to the invention.

The invention claimed is:

1. A method comprising:
    identifying, by a processor, spatial relationships between document objects of a document image;
    determining, by a processor, space separating pairs of neighboring document objects, wherein the space separating pairs of neighboring document objects is represented as weights in a weighted graph model; and
    determining, by a processor, a scaling factor based on the space separating the document objects in the document image and based on display device characteristics.

2. The method defined in claim 1 wherein determining the scaling factor comprises determining the scaling factor that causes scaling to the document image when applied while allowing a minimal amount of space separating the objects to remain visible when displayed on a display device having the display device characteristics.

3. The method defined in claim 1 further comprising representing the space between document objects with a graph model.

4. The method defined in claim 3 wherein the graph model is represented as a matrix.

5. The method defined in claim 3 wherein graph relationships in the graph model are represented as list pairs of connected vertices with included weights representing separating space between document objects.

6. The method defined in claim 1 wherein identifying spatial relationships between the document objects of the document image comprises determining a geometric relationship between two objects sharing an edge in a Voronoi triangulation diagram.

7. The method defined in claim 1 further comprising: representing the spatial relationships using Delaunay triangulation; and transforming triplets for the Delaunay triangulation into a graph model.

8. The method defined in claim 7 wherein the graph model includes a plurality of vertices, wherein each of the vertices is a representative point of one of the document objects.

9. The method defined in claim 8 wherein the representative point is a geometric center point.

10. The method defined in claim 8 wherein the representative point is a center of gravity.

11. The method defined in claim 1 wherein determining the space separating pairs of neighboring document objects comprises determining a length of a parameterized line segment through center points of each pair of neighboring document objects that intersects the separating space between objects, the length representing measured separating space.

12. The method defined in claim 11 further comprising adding weights into a graph model representing the spatial relationships between the document objects, the weights corresponding to the measured separating space.

13. The method defined in claim 12 further comprising normalizing the weights.

14. The method defined in claim 1 wherein determining the space separating pairs of neighboring document objects comprises determining a length of a parameterized line segment between each pair of neighboring document objects directed between center points of said each pair of neighboring document object that intersects the separating space between objects, the length representing measured separating space.

15. The method defined in claim 1 wherein determining at least one scaling factor based on the space separating the document objects in the document image and based on display device characteristics comprises determining the scaling factor using a constant reflecting a minimal visually recognizable space separation measured in pixels.

16. The method defined in claim 15 wherein the constant is set for a class of devices.

17. The method defined in claim 15 wherein the constant is set for a class of documents.

18. The method defined in claim 15 wherein the constant is computed from the document image and a display device characterization.

19. The method defined in claim 15 wherein the constant depends on a display device having the display device characteristics.

20. The method defined in claim 1 further comprising scaling the document using the scaling factor.

21. The method defined in claim 1 wherein the space comprises white space.

22. The method defined in claim 1 wherein the space comprises the background between foreground objects.

23. The method defined in claim 1 further comprising storing the graph as metadata in a file having an object-based file format that contains the document objects.

24. The method defined in claim 23 wherein the file is a JPM file.

25. The method defined in claim 23 wherein the file is a PDF file.

26. The method defined in claim 1 further comprising:
    creating a graph model to represent the spatial relationships between the document objects, the graph model including weights corresponding to the measured separating space; and
    merging vertices of the graph into a tree.

27. A computer-readable storage medium having instructions stored therein, which when executed by a system, cause the system to perform a method comprising:
    identifying spatial relationships between document objects of a document image;
    determining space separating pairs of neighboring document objects, wherein the space separating pairs of neighboring document objects is represented as weights in a weighted graph model; and
    determining a scaling factor based on the space separating the document objects in the document image and based on display device characteristics.

28. The computer-readable storage medium defined in claim 27 wherein determining the scaling factor comprises determining the scaling factor that causes scaling to the document image when applied while allowing a minimal amount of space separating the objects to remain visible when displayed on a display device having the display device characteristics.

29. The computer-readable storage medium defined in claim 27 wherein the method further comprises representing the space between document objects with a graph model.

30. The computer-readable storage medium defined in claim 29 wherein the graph model is represented as a matrix.

31. The computer-readable storage medium defined in claim 29 wherein graph relationships in the graph model are represented as list pairs of connected vertices with included weights representing separated space between document objects.

32. The computer-readable storage medium defined in claim 27 wherein identifying spatial relationships between the document objects of the document image comprises determining a geometric relationship between two objects sharing an edge in a Voronoi triangulation diagram.

33. The computer-readable storage medium defined in claim 27 wherein the method further comprises:
    representing the spatial relationships using Delaunay triangulation; and transforming triplets for the Delaunay triangulation into a graph model.

34. The computer-readable storage medium defined in claim 33 wherein the graph model includes a plurality of vertices, wherein each of the vertices is a representative point of one of the document objects.

35. The computer-readable storage medium defined in claim 33 wherein the representative point is a geometric center point.

36. The computer-readable storage medium defined in claim 33 wherein the representative point is a center of gravity.

37. The computer-readable storage medium defined in claim 27 wherein determining the space separating pairs of neighboring document objects comprises determining a length of a parameterized line segment through center points of each pair of neighboring document objects that intersects the separating space between objects, the length representing measured separating space.

38. The computer-readable storage medium defined in claim 37 wherein the method further comprises adding weights into a graph model representing the spatial relationships between the document objects, the weights corresponding to the measured separating space.

39. The computer-readable storage medium defined in claim 38 wherein the method further comprises normalizing the weights.

40. The computer-readable storage medium defined in claim 27 wherein determining the space separating pairs of neighboring document objects comprises determining a length of a parameterized line segment between each pair of neighboring document objects directed between center points of said each pair of neighboring document objects that intersects the separating space between objects, the length representing measured separating space.

41. The computer-readable storage medium defined in claim 27 wherein determining at least one scaling factor based on the space separating the document objects in the document image and based on display device characteristics comprises determining the scaling factor using a constant reflecting a minimal visually recognizable space separation measured in pixels.

42. The computer-readable storage medium defined in claim 41 wherein the constant is set for a class of documents.

43. The computer-readable storage medium defined in claim 41 wherein the constant is set for a class of devices.

44. The computer-readable storage medium defined in claim 41 wherein the constant is computed from the document image and a display device characterization.

45. The computer-readable storage medium defined in claim 41 wherein the constant depends on a display device having the display device characteristics.

46. The computer-readable storage medium defined in claim 27 wherein the method further comprises scaling the document using the scaling factor.

47. The computer-readable storage medium defined in claim 27 wherein the space comprises white space.

48. The computer-readable storage medium defined in claim 27 wherein the space comprises the background between foreground objects.

49. The computer-readable storage medium defined in claim 27 wherein the method further comprises storing the graph as metadata in a JPM file that contains the document objects.

50. The computer-readable storage medium defined in claim 27 wherein the method further comprises:
creating a graph model to represent the spatial relationships between the document objects, the graph model including weights corresponding to the measured separating space; and
merging vertices of the graph into a tree.

51. A system comprising:
a memory; and
a processor, coupled to the memory, to cause
a white space identifier to identify spatial relationships between document objects of a document image and determine space separating pairs of neighboring document objects, the space separating pairs of neighboring document objects is to be represented as weights in a weighted graph model; and
a scaling factor generator to determine a scaling factor in response to information on the space separating the document objects in the document image and display device characteristics.

52. A method comprising:
receiving, by a processor, a request to identify one or more documents that match a document having document objects;
comparing, by a processor, a graph model that represents the spatial relationships between the document objects with a first graph model of each of one or more documents in a document storage, the first graph model including weights corresponding to a measured separating space between pairs of neighboring document objects; and
returning, by a processor, an indication of the one or more matching documents based on a similarity threshold.

53. A method comprising:
receiving, by a processor, a plurality of structural elements of a document image; and
scaling, by a processor, the plurality of structure elements with a white space tree, wherein the white space tree is a weighted graph model including weights that represent space separating the structural elements.

54. The method defined in claim 53 wherein the white space tree comprises a geometric hierarchical layout structure.

55. The method defined in claim 54 wherein the geometric hierarchical layout structure comprises a weighted tree wherein the weights reflect minimal scaling.

56. A method comprising:
determining, by a processor, geometric neighborhood relationships between document objects in a document image using Voronoi diagrams;
generating, by a processor, a measure of separating white space as the length of a line segment intersecting white space between pairs of neighboring zones, wherein the measure of separating white space is weighted and included in a weighted graph model;
generating, by a processor, a representation of geometric scaling properties between document objects with a white space graph; and
generating, by a processor, a scaling factor based on the white space graph and based on display device characteristics.

57. The method defined in claim 56 further comprising identifying neighboring zones as edges between vertices in a white space graph.

58. A method comprising:
receiving, by a processor, a plurality of structural elements of a document image; and representing, by a processor, geometric scalability of the plurality of structural elements through a white space data structure, wherein the white space data structure is a weighted graph model including weights that represent space separating the plurality of structural elements.

59. The method defined in claim 58 wherein the white space data structure comprises a white space graph.

60. The method defined in claim 58 wherein the white space data structure comprises a white space tree.

61. A method comprising:
retrieving, by a processor, a white space data structure from a metadata portion of a file, wherein the white space data structure is a weighted graph model including weights that represent space between structural elements; and
controlling, by a processor, scaling during specific decoding tasks based on the retrieved white space data structure.

62. The method defined in claim 61 wherein the white space data structure comprises a white space graph.

63. The method defined in claim 61 wherein the white space data structure comprises a white space tree.

64. A method comprising:
receiving, by a processor, a collection of one or more documents; and
determining, by a processor, a size at which to display documents in the collection on a display using a white space graph, wherein the white space graph is a weighted graph model including weights that represent space between structural elements within the documents.

65. The method defined in claim 64 further comprising:
computing a white space graph for each document; and
determining a minimal scaling factor for each document.

66. The method defined in claim 65 further comprising:
scaling each document in the collection by its minimal scaling factor.

67. The method defined in claim 65 further comprising:
scaling each document in the collection by the largest of minimal scaling factors among documents in the collection.

* * * * *

UNITED STATES PATENT AND TRADEMARK OFFICE
CERTIFICATE OF CORRECTION

PATENT NO. : 7,623,711 B2 Page 1 of 1
APPLICATION NO. : 11/173766
DATED : November 24, 2009
INVENTOR(S) : Kathrin Berkner It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1102 days.

Signed and Sealed this

Twenty-sixth Day of October, 2010

David J. Kappos
*Director of the United States Patent and Trademark Office*